April 16, 1929.   T. C. DEMERS   1,709,524
BRAKE BAND FOR WARP BEAMS
Filed Nov. 30, 1927
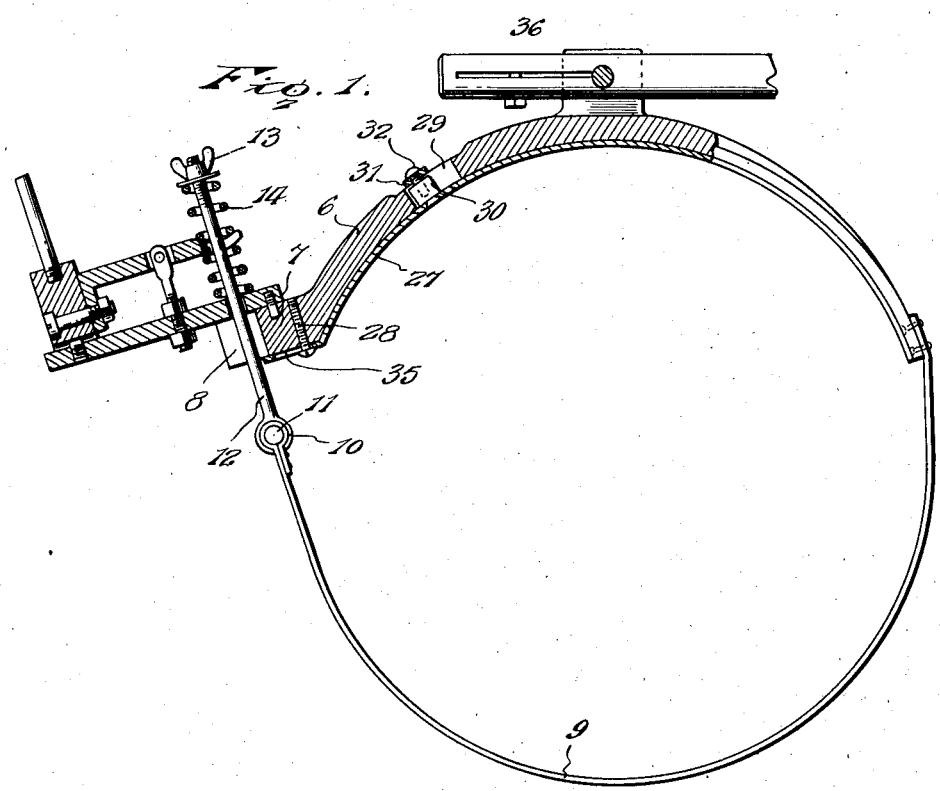
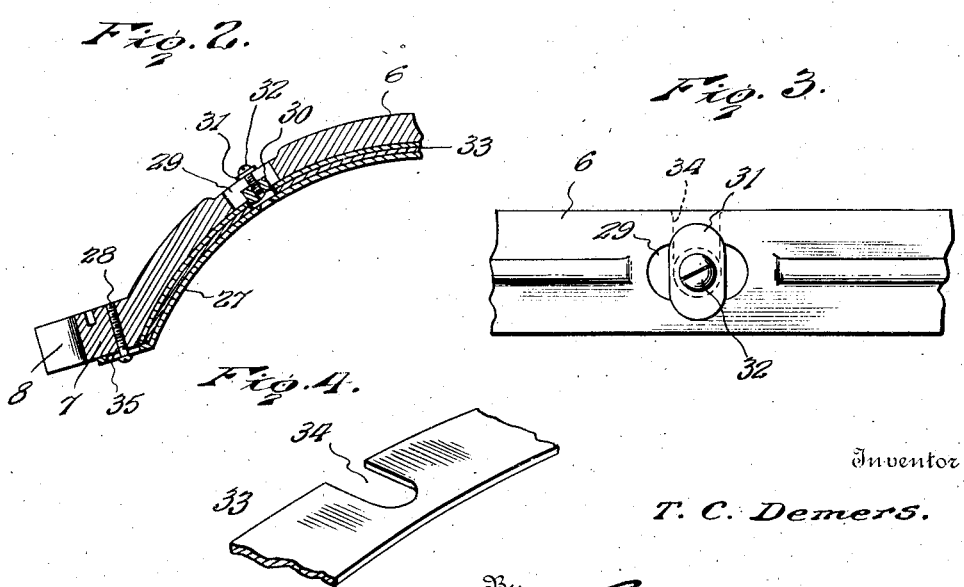
Inventor
T. C. Demers.
By Lacey & Lacey, Attorneys Patented Apr. 16, 1929.

1,709,524

UNITED STATES PATENT OFFICE.

TELESPHORE C. DEMERS, OF WINDSOR, VERMONT.

BRAKE BAND FOR WARP BEAMS.

Application filed November 30, 1927. Serial No. 236,786.

This invention relates to brake bands for warp beams and includes matter originally shown, described and claimed in an application, Serial No. 151,972, filed by me December 1, 1926, which application eventuated in Letters Patent No. 1,646,446, October 25, 1927.

The object of the present invention is to provide a simple and inexpensive mounting for the brake band whereby the band may be readily adjusted to the diameter of the warp beam head and the introduction of shims, when necessary, will be facilitated. The invention is illustrated in the annexed drawing and will be hereinafter fully set forth.

In the drawing:

Figure 1 is a longitudinal section of a warp beam brake embodying the invention;

Fig. 2 is a fragmentary section showing a different adjustment of the band;

Fig. 3 is a fragmentary plan view, and

Fig. 4 is a detail perspective of a portion of a shim plate.

The brake shoe 6, which rests upon the beam head (not shown), is provided at one end with a laterally projecting lug 7 having a notch 8 in its outer end. To the opposite end of the shoe 6 is secured one end of a brake band 9 which is preferably of resilient metal and is carried under the beam head so as to bear against the same and terminates in eyes 10 receiving a stud or pin 11, upon which is pivotally mounted a tension bolt or screw 12 in a well-known manner. The tension bolt or screw 12 extends through the notch 8 at the end of the shoe and is equipped at its upper extremity with a wing nut 13 cooperating with a tension spring 14 and locking devices whereby the band 9 may be drawn into yieldable frictional contact with the beam head in the usual manner.

The shoe 6 is equipped on its under side with the resilient metal lining plate 27 which extends from the lug 7 to the opposite end of the shoe and has one end extended partly under the said lug and secured thereto by a screw 28, as shown clearly in Figs. 1 and 2. Near the lug 7, the shoe is constructed with a short longitudinally extending slot 29 receiving the body of a stud 30 which is upset against or riveted to the plate 27. Bearing against the outer side of the shoe is a washer 31 which is held in place by a headed screw 32 inserted through the washer to engage the stud 30, and the said washer, as shown in Fig. 3, has the same contour as the slot 29 but is slightly wider so that it will overlap the walls of the slot and constitute an abutment for the screw head. When the parts are assembled in the working position, the washer preferably extends across the slot, as shown in Fig. 3, and the screw is turned home against the washer so that the plate 27 will be held firmly to the inner concave surface of the shoe. Should the beam head become worn or for any other reason there should be an improper fit between the plate 27 and the beam head, a shim plate 33 is fitted between the shoe and the lining plate 27 very easily and quickly. To accomplish this result, the screw 32 is loosened and the plate 27 is thus permitted to slightly separate from the shoe, remaining attached thereto, however, by the screw 28. The shim plate is constructed, in one edge, with a notch 34 of sufficient width to pass around the stud 30 and it will, therefore, be seen that, after the lining plate 27 has been released in the manner described, the shim plate may be inserted edgewise between the lining plate and the inner surface of the shoe with the notch alined with the stud and may be pushed laterally into position, after which the lining plate may be pressed back against the shim plate and all the parts secured by turning home the screw 32, as shown in Fig. 2. The shim plate can thus be easily fitted in place without requiring the removal of the tension device from the beam head, and one or more shim plates may be inserted as may be necessary.

It will be noted that the anchoring screw 28 passes through a longitudinal slot 35 in the end of the lining plate 27 with the head of the screw bridging the slot to retain the plate in position, although the plate may be supported by beveling the side walls of the slot and countersinking the head of the screw. The opposite end of the plate 27 is free so that, by reason of its resiliency, the plate may conform automatically to the diameter of the beam head to which it is applied.

When the brake is applied to the largest warp beam head, the stud 30 is at one end of the slot 29 and one end of the slot 35 abuts the screw 28, as shown in Fig. 1. When the device is applied to a smaller beam head, the stud 30 moves along the slot 29 and the slotted end of the plate moves across the screw 28, as will be understood on reference to Fig. 2, so that the shims of spring steel or other material may be easily inserted and the proper fit between the brake and the beam head attained.

The brake shoe is carried by a warp tension equalizer, a part of which is indicated at 36.

Having thus described the invention, I claim:

1. In an apparatus for the purpose set forth, the combination of a brake shoe provided adjacent one end with a longitudinally extending slot, a brake liner secured at one end to the adjacent end of the shoe and extending over the slot, a stud carried by the liner and entering the slot, a washer arranged to bridge the slot, and a fastening screw inserted through said washer and engaged in the stud.

2. In an apparatus for the purpose set forth, the combination of a brake shoe, a brake liner attached at one end to the corresponding end of the shoe, means adjacent said end to releasably hold the liner to the shoe, and a shim plate constructed in one longitudinal edge to fit around said holding means whereby the shim plate may be inserted edgewise between the liner and the shoe.

3. In an apparatus for the purpose set forth, the combination of a brake shoe provided adjacent one end with a slot, a brake liner attached at one end to the adjacent end of the shoe and extending over the slot, a fastening device on the brake liner entering the slot, a shim plate insertible between the liner and the shoe and having a notch in one edge to engage around the said fastening device, and means engaged with said fastening device and cooperating with the outer surface of the shoe to secure the liner and the shim to the shoe.

4. In an apparatus for the purpose set forth, the combination of a shoe, a resilient brake liner attached at one end to the shoe and movable about said end toward and from the shoe to permit lateral insertion of a shim between the shoe and the liner, and means cooperating with intermediate portions of the shoe and the liner to retain the liner against the shoe, said means being movable with the liner relative to the shoe.

5. The combination of a shoe provided with a longitudinal slot, a headed element inserted in the inner surface of the shoe at the end thereof, a liner having a slot at one end engaging said fastener whereby the end of the liner will be supported by the head of said element, a stud on the liner entering the slot in the shoe, and retaining means carried by the outer face of the shoe and engaged with the stud.

In testimony whereof I affix my signature.

TELESPHORE C. DEMERS. [L. S.]